(12) United States Patent
Bunch et al.

(10) Patent No.: US 7,855,673 B2
(45) Date of Patent: Dec. 21, 2010

(54) HOLOGRAPHIC IMAGING OF NATURAL-FIBER-CONTAINING MATERIALS

(75) Inventors: Kyle J. Bunch, Richland, WA (US);
Brian J. Tucker, Pasco, WA (US);
Ronald H. Severtsen, Richland, WA (US); Thomas E. Hall, Kennewick, WA (US); Douglas L. McMakin, Richland, WA (US); Wayne M. Lechelt, West Richland, WA (US); Jeffrey W. Griffin, Kennewick, WA (US); David M. Sheen, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 196 days.

(21) Appl. No.: 12/170,944

(22) Filed: Jul. 10, 2008

(65) Prior Publication Data
US 2008/0272954 A1    Nov. 6, 2008

Related U.S. Application Data

(63) Continuation-in-part of application No. 11/240,519, filed on Sep. 30, 2005, now Pat. No. 7,548,185.

(51) Int. Cl.
*G01S 13/00* (2006.01)
(52) U.S. Cl. .......................... 342/22; 342/179
(58) Field of Classification Search ............. 342/22, 342/179
See application file for complete search history.

(56) References Cited

U.S. PATENT DOCUMENTS

| 3,748,578 | A | 7/1973 | Ward |
| 4,500,835 | A | 2/1985 | Heikkila |
| 5,455,590 | A | 10/1995 | Collins et al. |
| 5,557,283 | A | 9/1996 | Sheen et al. |
| 5,859,609 | A | 1/1999 | Sheen et al. |
| 6,507,309 | B2 | 1/2003 | McMakin et al. |
| 6,703,964 | B2 | 3/2004 | McMakin et al. |

(Continued)

OTHER PUBLICATIONS

Rao, Dec. 11, 2003, Mitre, GPS Microstrip Antenna Array on a Resistivity Tapered Ground Plane for Multipath Mitigation, p. 2-3.*

(Continued)

*Primary Examiner*—Thomas H Tarcza
*Assistant Examiner*—Harry Liu
(74) *Attorney, Agent, or Firm*—Allan C. Tuan (57) ABSTRACT

The present invention includes methods and apparatuses for imaging material properties in natural-fiber-containing materials. In particular, the images can provide quantified measures of localized moisture content. Embodiments of the invention utilize an array of antennas and at least one transceiver to collect amplitude and phase data from radiation interacting with the natural-fiber-containing materials. The antennas and the transceivers are configured to transmit and receive electromagnetic radiation at one or more frequencies, which are between 50 MHz and 1 THz. A conveyance system passes the natural-fiber-containing materials through a field of view of the array of antennas. A computing device is configured to apply a synthetic imaging algorithm to construct a three-dimensional image of the natural-fiber-containing materials that provides a quantified measure of localized moisture content. The image and the quantified measure are both based on the amplitude data, the phase data, or both.

16 Claims, 9 Drawing Sheets

U.S. PATENT DOCUMENTS

| | | |
|---|---|---|
| 7,034,746 B1 | 4/2006 | McMakin et al. |
| 7,253,766 B2 | 8/2007 | Foote et al. |
| 7,295,146 B2 | 11/2007 | McMakin et al. |
| 7,326,120 B2 * | 2/2008 | Bellows et al. ............... 472/119 |
| 7,365,672 B2 | 4/2008 | Keller et al. |
| 2003/0042180 A1 * | 3/2003 | Kairi .......................... 209/518 |
| 2005/0146863 A1 * | 7/2005 | Mullani ...................... 362/140 |

OTHER PUBLICATIONS

Harriman, Lew; "A Visual Moisture-Detection Method", HPAC Engineering, Dec. 2004, 23-29 pps., Portsmouth, NH.
Wood, Scott, et al.; "IR Thermography in the Building Science Industry", Inframation 2003, Aug. 15, 2003.
U.S. Appl. No. 11/240,519, filed Sep. 30, 2005, David M. Sheen, et al.
U.S. Appl. No. 11/435,003, filed May 15, 2006, Douglas L. McMakin et al.

* cited by examiner

HOLOGRAPHIC IMAGING OF NATURAL-FIBER-CONTAINING MATERIALS

PRIORITY

This invention claims priority from, and is a continuation-in-part of, patent application Ser. No. 11/240,519, filed Sep. 30, 2005 now U.S. Pat. No. 7,548,185, which is herein incorporated by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

This invention relates to imaging material properties in natural-fiber-containing materials. Rapid and accurate characterization of material properties, which can include, but are not limited to, moisture content, fiber structure, and grain structure (e.g., knots or imperfections), can be critical in determining the quality of a material and/or the ability of the material to be processed into various products. Many of the current systems for measuring material properties must contact the natural-fiber-containing materials and/or do not provide images. For example, many traditional systems for measuring moisture content use a "feeler" device that contacts the material to determine electrical conductivity. The feelers can accumulate dirt and wear out. Other systems, including those involving electromagnetics, typically perform spot measurements of moisture content and do not create images of the material showing localized moisture. Still other systems generate maps, but not true images, of fiber structure, grain structure, and/or knot distribution. Accordingly, a need exists for tools to image material properties in natural-fiber-containing materials without contacting the materials.

SUMMARY

Embodiments of the present invention include methods and apparatuses for imaging material properties in natural-fiber-containing materials. The holographic images provide quantified measures of localized moisture content, which can be important in the context of processing the natural-fiber-containing materials. For example, moisture levels must be closely regulated when processing plywood, oriented strand board (OSB), particle board, wood veneer, and composite materials. Similarly, moisture levels must be closely monitored when processing grain, tea, and other products that are moisture-sensitive, dried, and/or roasted.

While a variety of embodiments of the present invention are contemplated, in a preferred embodiment, an array of antennas and at least one transceiver collects amplitude and phase data from radiation interacting with the natural-fiber-containing materials. The antennas and the transceivers are configured to transmit and receive electromagnetic radiation at one or more frequencies, which are between 50 MHz and 1 THz. In a preferred embodiment, the frequencies are between 200 MHz and 1 THz. A conveyance system passes the natural-fiber-containing materials through a field of view of the array of antennas. A computing device is configured to apply a synthetic imaging algorithm to construct a three-dimensional image of the natural-fiber-containing materials that provides a quantified measure of localized moisture content. The image and the quantified measure are both based on the amplitude data, the phase data, or both.

As used herein, "natural-fiber-containing materials" can refer to materials that contain, derive from, or are made of naturally occurring fibers from plant, animal, or mineral sources. Examples of naturally occurring fibers from plants include, but are not limited to, the seed, a leaf, bast, fruit, and stock fibers. Examples of naturally occurring fibers from animals include, but are not limited to animal hair, silk fiber, and avian fiber. Examples of naturally occurring fibers from minerals include, but are not limited to, asbestos and ceramic fibers (e.g., glass fibers, aluminum oxide, silica carbide, boron carbide, etc.). Accordingly, exemplary natural-fiber-containing materials can include, but are not limited to, wood, wood products, composite materials containing natural fibers, plants, grain, and tea leaves.

In some embodiments, the array of antennas comprises a linear array of interlaced antennas. Interlacing the antennas allows the overall number of antennas included in the array to be reduced because some of the antennas can be switched to transmit or receive according to a pattern or sequence. Additionally, the array of antennas can be configured for cross polarization, which can minimize the effect of surface reflections off of the natural-fiber-containing materials. In still other embodiments, the electromagnetic radiation comprises circularly polarized radiation. In those instances when the natural-fiber-containing materials exhibit fiber structure, grain structure, and/or knots (e.g., wood veneer, plywood, OSB, particle board, etc.) circularly polarized radiation can be used to optimally image the fiber structure, grain structure, and/or knots. Furthermore, higher frequency radiation (i.e., 10 GHz and above) can improve resolution for identifying the fiber structure, grain structure, and/or knots, while lower frequencies (i.e., 1-3 GHz) can be well suited for determination of moisture content.

Embodiments of the present invention can be arranged to operate in one of at least two modes. In a reflection mode of operation, electromagnetic radiation interacts with the natural-fiber-containing materials and is reflected back in an amount related to the dielectric constant. The array of antennas receives this reflected radiation as data to construct the image. In a through-transmission mode of operation, electromagnetic radiation is transmitted through the natural-fiber-containing materials and can be reflected by a reflector placed behind the natural-fiber-containing materials, relative to the array of antennas. The originally transmitted radiation is attenuated by its interactions with the natural-fiber-containing materials and the attenuated radiation is then used as data to construct the image. Particular embodiments can further comprise a substantially fully reflective reference sample that is passed through the field of view with each one of the natural-fiber-containing materials, or with a batch of natural-fiber-containing materials. The reference sample can provide a reference measurement for moisture content quantification and/or calibration purposes.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, a number of embodiments are described, including the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications thereto and embodiments thereof. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Figure 1A:
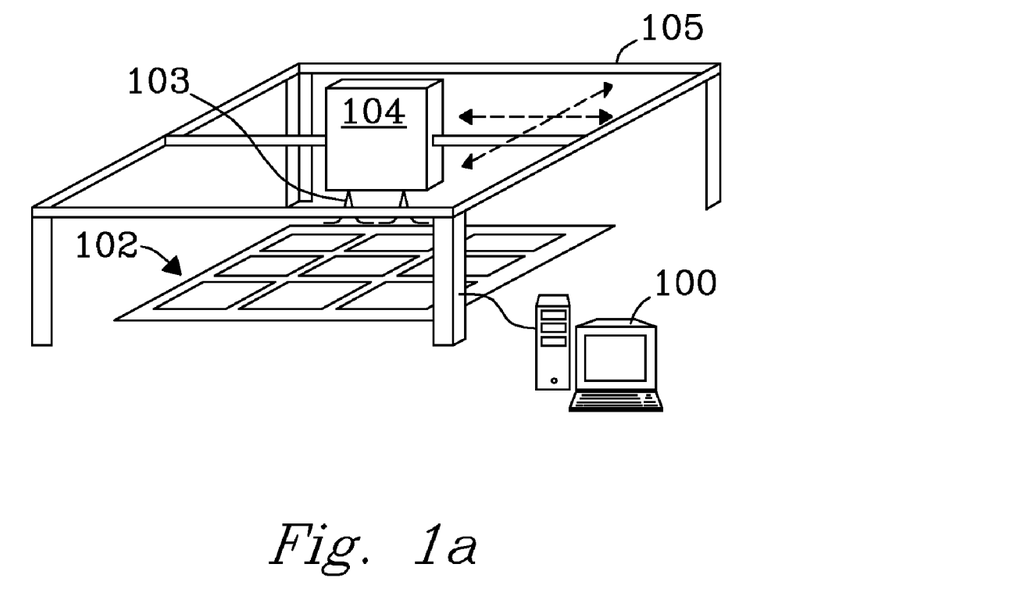
FIG. 1 is an illustration depicting one embodiment of an apparatus for imaging material properties in natural-fiber-containing materials.
Figure 1B:
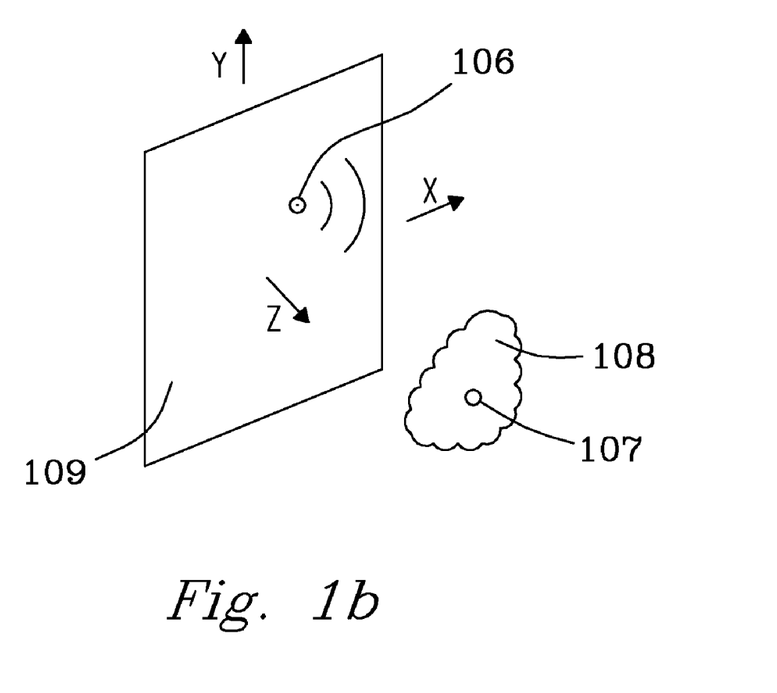

Referring to FIGS. 1a and 1b, illustrations depict one embodiment of an apparatus for imaging material properties in natural-fiber-containing materials. FIG. 1a depicts generally an embodiment of the present invention including an imaging workstation 100 that receives and process data from a holographic transceiver 104 having an antenna array 103 configured for transmission and reception. An exemplary imaging workstation can comprise a scanner controller, data acquisition hardware and software, holographic imaging software, and reconstruction software. The antenna 103 can be mechanically and/or electronically scanned across a sample 102 using, at least in part, a rectilinear scanner 105. As illustrated, the sample 102 comprises 8 swatches of plywood and a metal reference plate.

Referring to FIG. 1b, holographic radar data collection is performed by electronically or mechanically scanning a transceiver or antenna array 106, which can be arranged linearly or two-dimensionally across a planar (i.e., two-dimensional) aperture 109. The microwave/millimeter-wave transceiver 106 emits a diverging beam that interacts with the imaging target 108 and then measures the amplitude and phase of the scattered wavefront at each sampled position 107 and frequency over the scanned aperture 109. This dataset is three-dimensional with dimensions consisting of the two aperture dimensions and the frequency dimension. Wavefront reconstruction techniques can be used to mathematically focus these data using computer-based image reconstruction algorithms, and using the frequency dimension to recover the third spatial dimension. The resolution achievable with these imaging techniques is limited by diffraction of the waves, which is determined by the wavelength range and bandwidth of operation. The lateral resolution of the system can be described approximately by the following equation, where $\lambda_c$ is the mid-band wavelength and $F^\#$ (F-number) is the range divided by the aperture size.

$$\delta_x \approx \frac{\lambda_c}{2}\left(\frac{\text{range}}{\text{apertue}}\right) \approx \frac{\lambda_c}{2} F^\# \quad (1)$$

Depth resolution can be described by Equation 2, where $c=3\times10^8$ M/s is the speed of light and B is the bandwidth of the system. For example, a millimeter-wave imaging system that operates over the 25-35 GHz frequency range with a 1 meter square aperture and a 1 meter range has mid-band wavelength of 1 cm, $F^\#=1$, and bandwidth B=10 GHz. This results in a lateral resolution of 0.5 cm and a depth resolution of 1.5 cm.

$$\delta_z \approx \frac{c}{2B} \quad (2)$$

FIGS. 2-10 include data obtained using the apparatus depicted in FIG. 1. Multi-frequency microwave scans of 16 coupons of wood, approximately ⅛ inch (3 mm) thick, 9 inches long (with the grain), and 9.5 inches wide (across the grain), were made. The weight percent of moisture (i.e., the difference between wet and dry wood divided by the dry weight) in the coupons was determined by weighing before and after scanning, then drying and weighing after the scanning was completed.

The scans covered the ranges from 2 to 4 GHz and 8 to 18 GHz. The scan radiofrequency (RF) modes included linear polarized, co-polarized, and cross-polarized configurations. The linear scans were either polarization aligned with the grain direction ("Aligned") or polarization perpendicular to the grain direction ("Cross"). Co-polarized scans were designated Right-Right ("RR") and cross-polarized as "LR".

The lowest-frequency data set in each scan was used to create a mask defining the location of each coupon in the scan. The masks were used to create, for each scan, a text file containing the average amplitude of each coupon for each frequency. For each rf mode, the text files were imported into a spreadsheet. The data was normalized to the average reflected amplitude from the metal plate for the respective set. The normalized data were used to create plots of average amplitude (Y axis) as a function of moisture content (X axis).

Overall, the plots show an increase in reflectivity with moisture content, up to a certain level. This level, and behavior above that level, depend on both frequency and polarization. At the low end (e.g., 5%-9%), the plots generally show an irregular cluster. On a larger scale, the linear and cross-polarized data show an increase in reflectivity up to about 80%, and level or slightly declining after that. The co-polarized data show an increase to about 60% and then a decrease of comparable slope out to 120% (where the data end).

Only one scan was done at low frequency (e.g., 2-4 GHz). It was done in LR mode. The correspondence of reflected amplitude to moisture content was nearly linear to about 100%. However, the spatial resolution appeared to be rather low. Since the scan was done on larger increments than the other scans (i.e., 50 points versus 200 to 240 points), it is hard to discriminate the loss in radar resolution from the loss in scan resolution. Specifics regarding the data are discussed in the following paragraphs.

Figure 2:
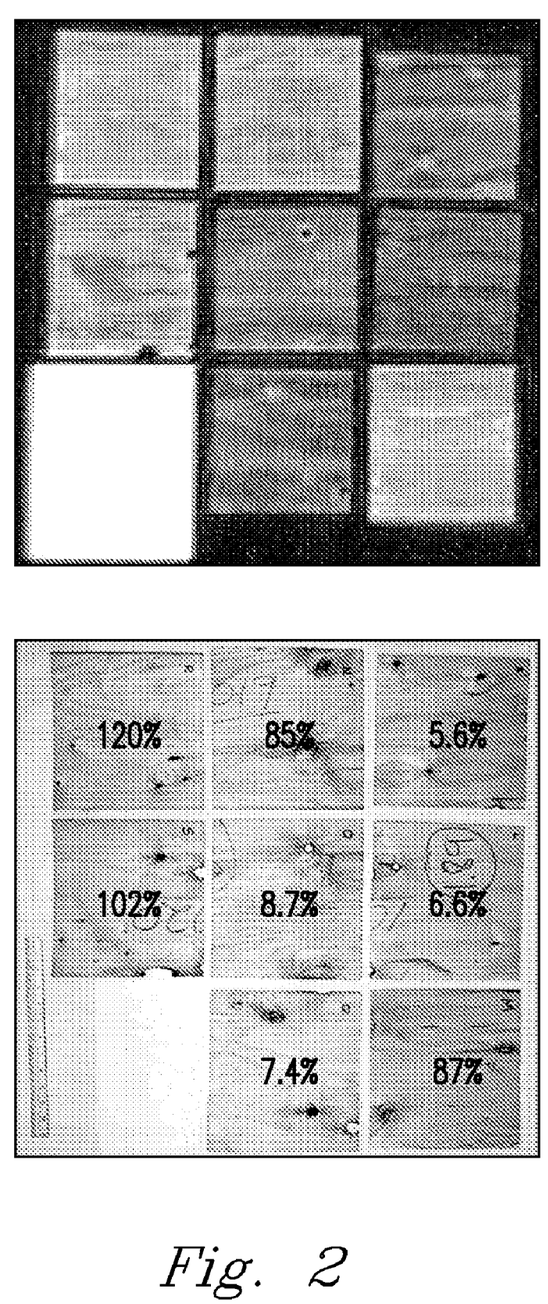
FIG. 2 includes an image of eight wood coupons having various moisture levels, which image was generated using high-frequency, cross polarized radiation.

Referring first to FIG. 2, eight coupons of wood having varying degrees of moisture have been imaged using cross polarized, high-frequency (e.g., 17.6 GHz) electromagnetic radiation in the reflection mode of operation. A reflector comprising a metal plate was placed in the lower left corner as a reference. Adjacent to the image is a photo of the grid of coupons that indicates the moisture content in each coupon. The moisture content was determined as a weight percent by weighing before and after scanning, then drying and weighing after scanning. Comparison of the image with the photo shows that image brightness is strongly correlated with moisture content in each of the coupons.

Figure 3:
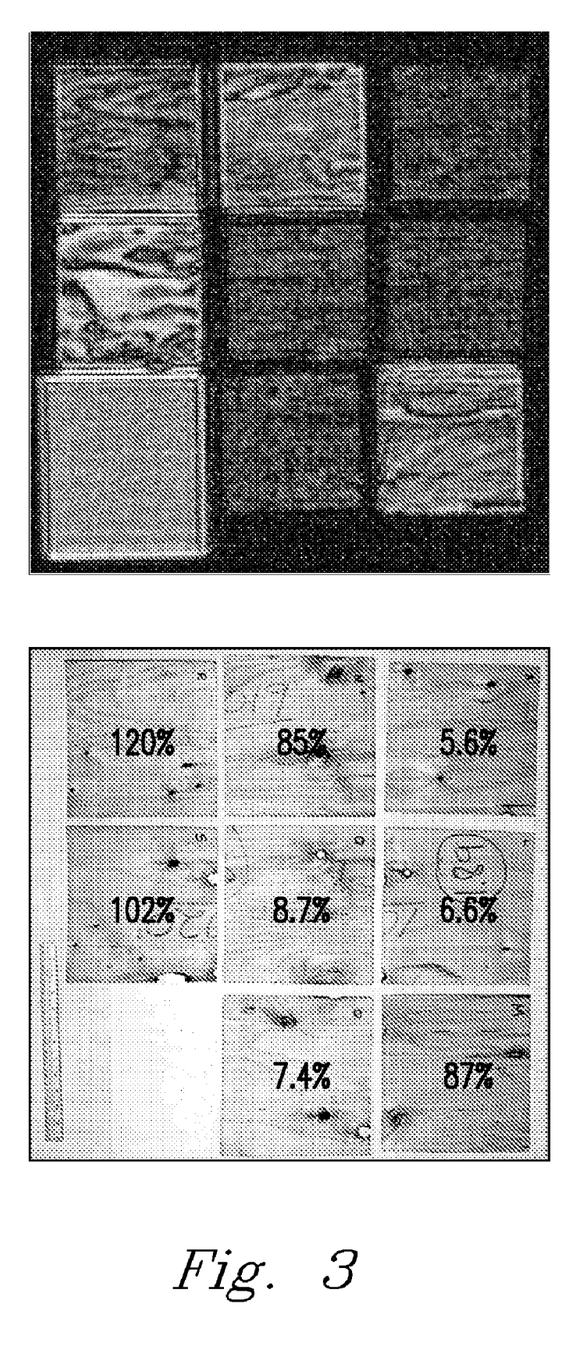
FIG. 3 includes an image of eight wood coupons having various moisture levels, which image was generated using high-frequency, co-polarized radiation.
Figure 4:
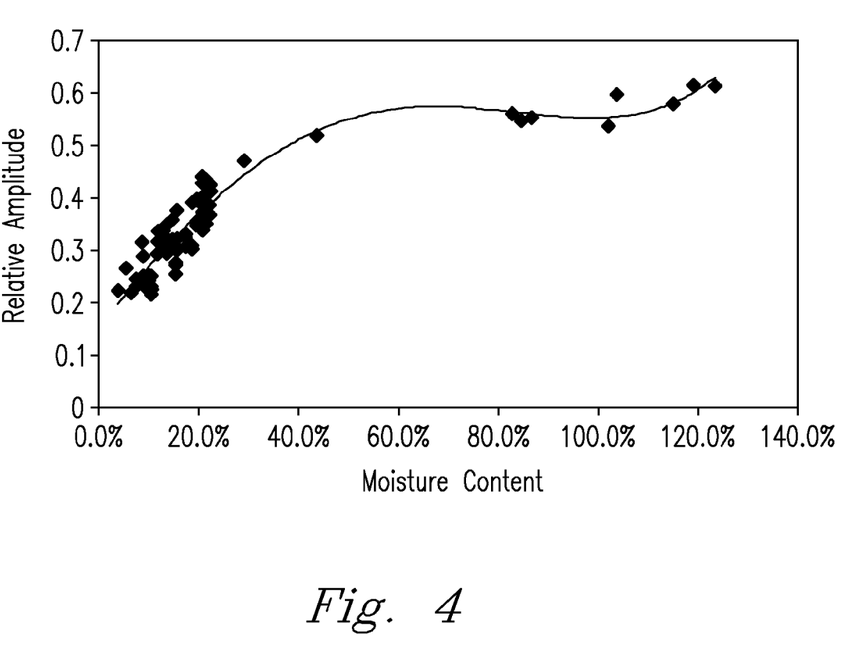
FIG. 4 is a scatter plot of the relative amplitude as a function of moisture content for data generated using high frequency, cross polarized radiation.

Referring to FIG. 3, the same grid of coupons was imaged using co-polarized radiation. The results indicate that high-frequency, co-polarized radiation is effective in revealing grain structure, but is not as suitable as cross polarized radiation for quantifying moisture. FIG. 4 includes a scatter plot of the relative amplitude as a function of moisture content. The relative amplitude was measured as the brightness in the image obtained using high-frequency, cross polarized radiation. As described below, low-frequency radiation is more effective for quantifying moisture levels.

Figure 5:
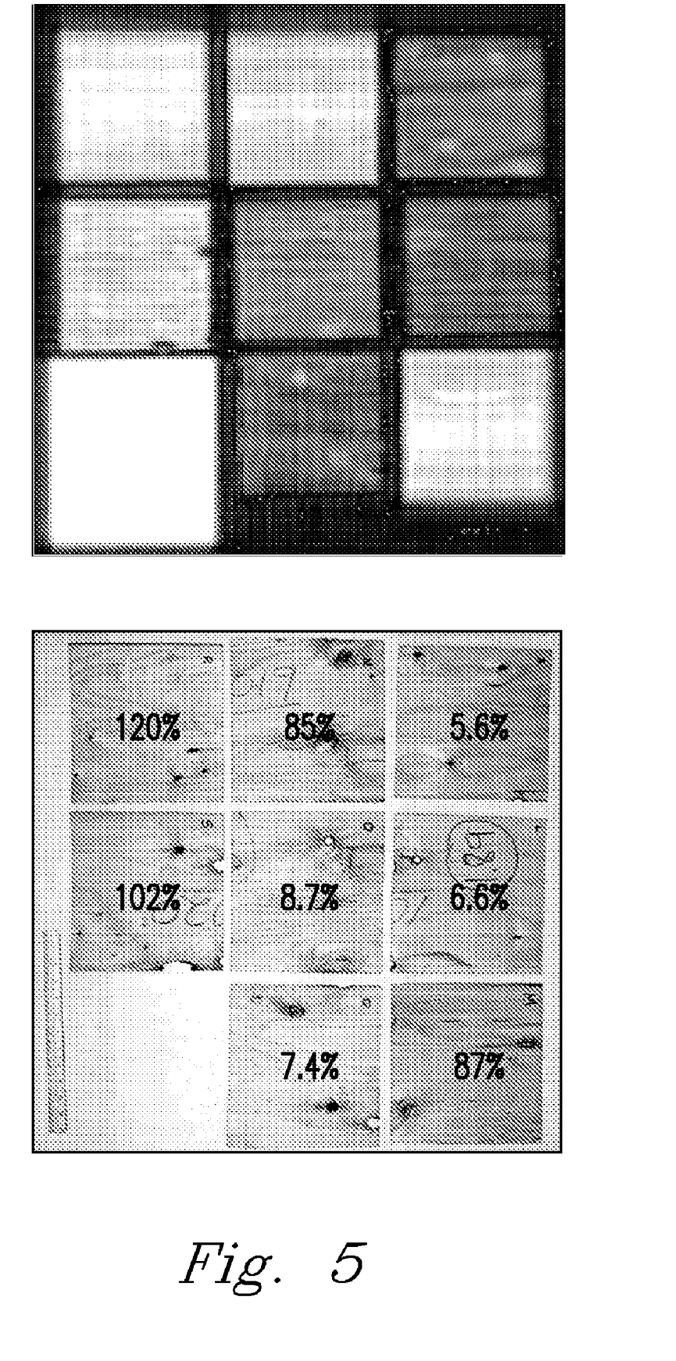
FIG. 5 includes an image of eight wood coupons having various moisture levels, which image was generated using mid-frequency, cross polarized radiation.
Figure 6:
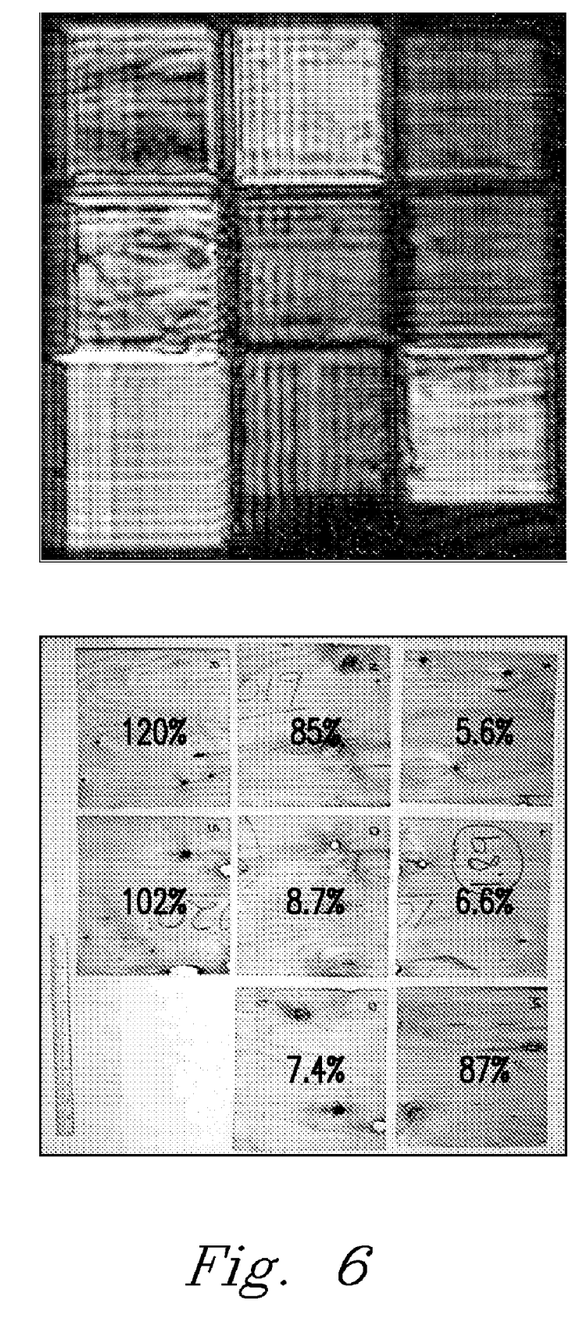
FIG. 6 includes an image of eight wood coupons having various moisture levels, which image was generated using mid-frequency, co-polarized radiation.
Figure 7:
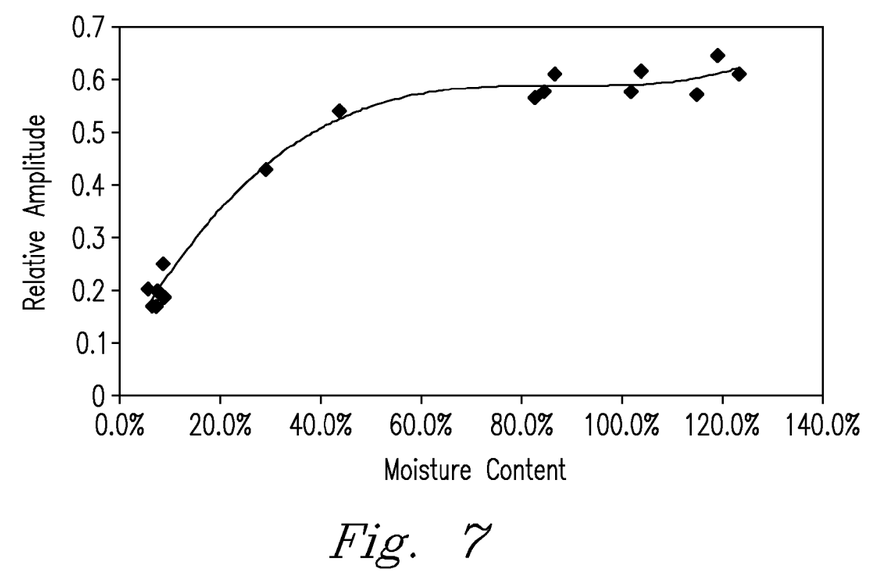
FIG. 7 is a scatter plot of the relative amplitude as a function of moisture content for data generated using mid-frequency, cross polarized radiation.
Figure 8:
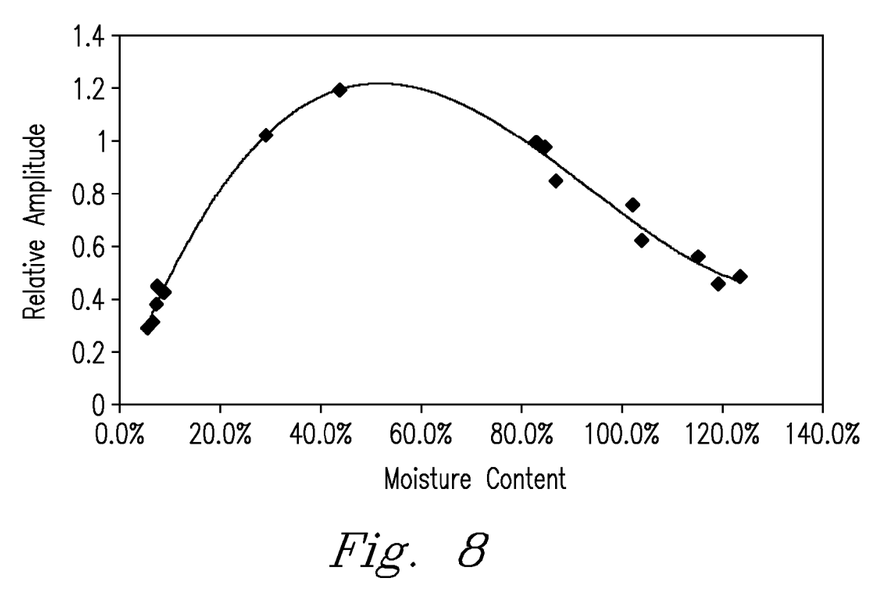
FIG. 8 is a scatter plot of the relative amplitude as a function of moisture content for data generated using mid-frequency, co-polarized radiation FIG. 9 includes an image of eight wood coupons having various moisture levels, which image was generated using low-frequency, cross polarized radiation.

Referring to FIG. 5, an image of the same grid of coupons was generated using mid-frequency (e.g., 11.8 GHz), cross polarized radiation. Compared to the image in FIG. 2, mid-frequency radiation results in lower image detail. However, grain pattern is still evident. However, the brightness of the coupon images correlates well with moisture levels. Referring to FIG. 6, a mid-frequency, co-polarized image provides grain structure, although it lacks the detail contained in the high-frequency images. Referring to the scatter plots and FIGS. 7 and 8, which show relative amplitude as a function of moisture content from cross polarized and co-polarized images, respectively, it is evident that while lower frequencies can generate stronger correlations between brightness and moisture level, co-polarized radiation is not suited for tracking moisture levels over the entire ranges shown, though it could be used over low and high ranges separately.

Figure 9:
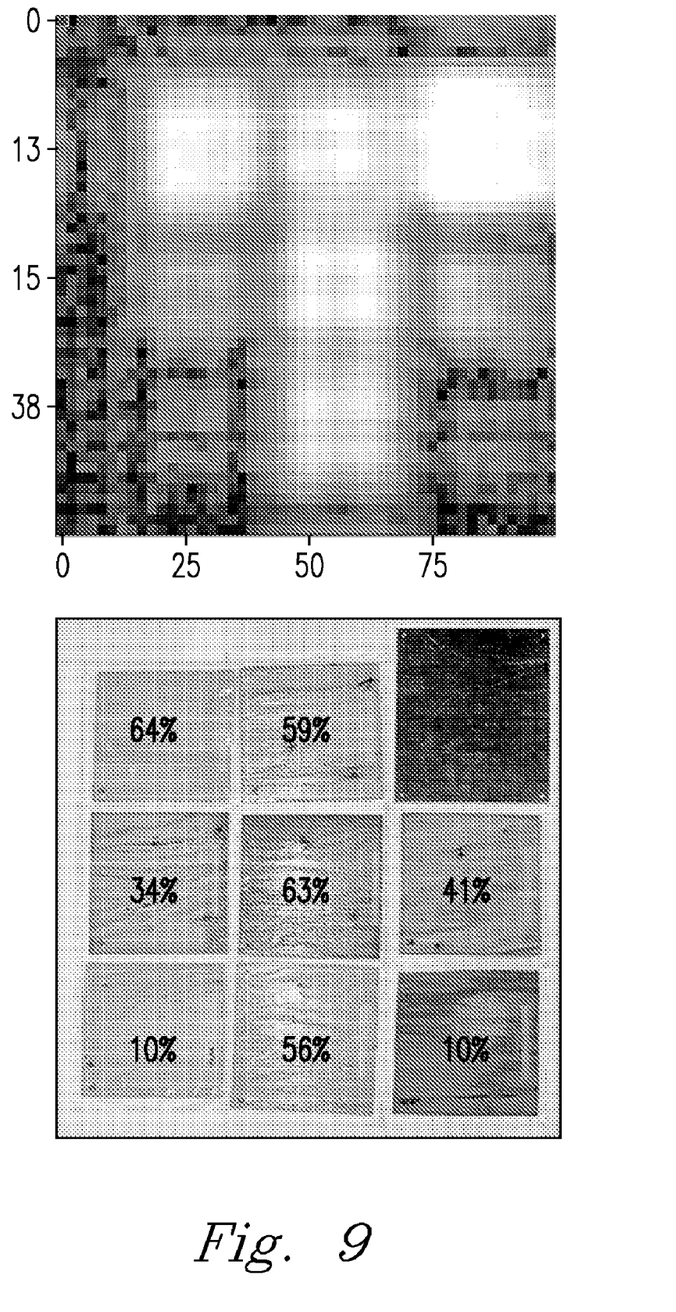
Figure 10:
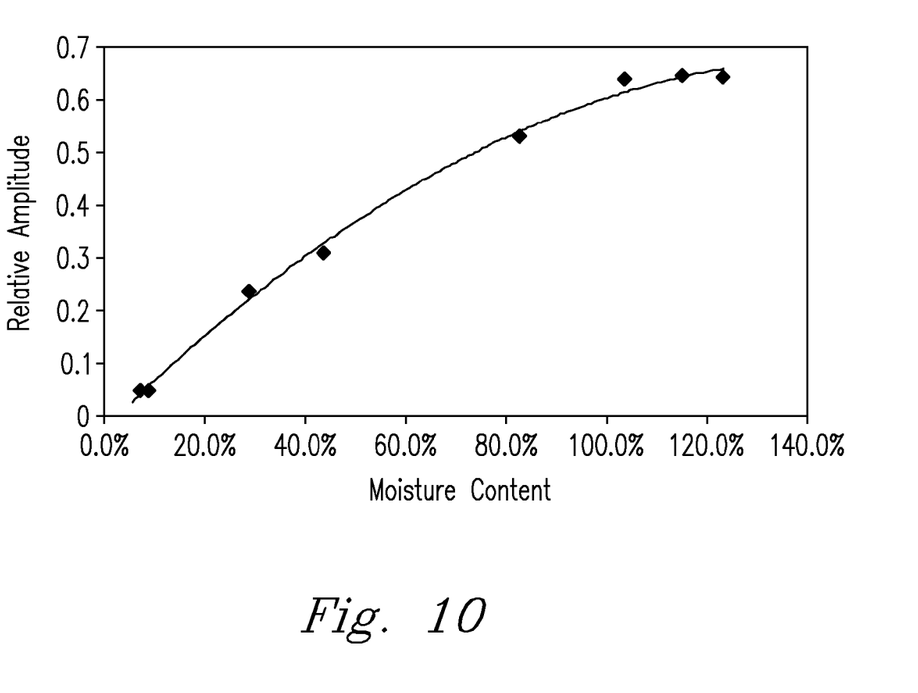
FIG. 10 is a scatter plot of the relative amplitude as a function of moisture content for data generated using low-frequency, cross polarized radiation.

Referring to FIG. 9, an image of the same grid of coupons was generated using low-frequency (e.g., 2.1 GHz), cross polarized radiation. The low-frequency image has low resolution, but correlates extremely well with moisture levels, as shown in FIG. 10. FIG. 10 includes a scatter plot showing relative amplitude as a function of moisture content from the data generated by low-frequency, cross polarized radiation, and shows that the low-frequency radiation is highly effective at tracking moisture content.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An apparatus for imaging material properties in natural-fiber-containing materials, the apparatus comprising
    an array of antennas and at least one transceiver, wherein the antennas and transceivers are configured to transmit and receive electromagnetic radiation at one or more frequencies, which are between 50 MHz and 1 THz, and to collect amplitude and phase data from radiation interacting with the natural-fiber-containing materials;
    a conveyance system to pass the natural-fiber-containing materials through a field of view of the array of antennas;
    a computing device configured to apply a synthetic imaging algorithm using at least the phase data to construct a three-dimensional image of the natural-fiber-containing materials that provides a quantified measure of localized moisture content based at least on the amplitude data.

2. The apparatus of claim 1, wherein the natural-fiber-containing materials comprise plywood.

3. The apparatus of claim 1, wherein the three-dimensional image further provides details regarding fiber structure, grain structure, knots, or combinations thereof.

4. The apparatus of claim 1, wherein the array of antennas comprises a linear array of interlaced antennas.

5. The apparatus of claim 1, wherein the array of antennas is configured in a cross polarization configuration to minimize the effect of surface reflections.

6. The apparatus of claim 1, configured for through-transmission operation, wherein a reflector behind the natural-fiber-containing materials substantially fully reflects the electromagnetic radiation.

7. The apparatus of claim 1, further comprising a substantially fully reflective reference sample that is passed through the field of view with each one of the natural-fiber-containing materials, or with a batch of natural-fiber-containing materials, the reference sample providing a reference measurement for moisture content quantification.

8. The apparatus of claim 1, wherein the electromagnetic radiation comprises circularly polarized radiation.

9. A method for imaging material properties in natural-fiber-containing materials, the method comprising:
    passing the natural-fiber-containing materials through a field of view of an array of antennas operably connected to at least one transceiver, wherein the array of antennas and the transceivers are configured to transmit and receive electromagnetic radiation at one or more frequencies, which are between 50 MHz and 1 THz;
    collecting amplitude and phase data from radiation interacting with the natural-fiber-containing materials;
    constructing a three-dimensional image of the natural-fiber-containing materials using at least the phase data according to a synthetic imaging algorithm; and
    quantifying localized moisture content from the three-dimensional image using at least the amplitude data.

10. The method of claim 9, wherein the natural-fiber-containing materials comprise plywood.

11. The method of claim 9, wherein the three-dimensional image further provides details regarding fiber structure, grain structure, knots, or combinations thereof.

12. The method of claim 9, further comprising interlacing transmit and receive functions of the antennas, wherein the antennas are arranged in a linear array.

13. The method of claim 9, wherein the array of antennas is configured in a cross polarization configuration to minimize the effect of surface reflections.

14. The method of claim 9, wherein said collecting is performed in a through-transmission mode, and further comprises substantially fully reflecting the electromagnetic radiation off of a reflector behind the natural-fiber containing materials.

15. The method of claim 9, further comprising passing a substantially fully reflective reference sample through the field of view with each one of the natural-fiber-containing materials, or with a batch of natural-fiber-containing materials, thereby providing a reference measurement for moisture content quantification.

16. The method of claim 9, wherein the electromagnetic radiation comprises circularly polarized radiation.

* * * * *